United States Patent
Cunningham-Rhoads et al.

(10) Patent No.: US 12,303,765 B2
(45) Date of Patent: May 20, 2025

(54) FIELD RATING AND COURSE ADJUSTED STROKES GAINED FOR GLOBAL GOLF ANALYSIS

(71) Applicant: STATS LLC, Chicago, IL (US)

(72) Inventors: Kyle Cunningham-Rhoads, Durham, NC (US); Kevin Chroust, Chicago, IL (US); Taylor Bechtold, Chicago, IL (US)

(73) Assignee: STATS LLC, Chicago, IL (US)

( * ) Notice: Subject to any disclaimer, the term of this patent is extended or adjusted under 35 U.S.C. 154(b) by 368 days.

(21) Appl. No.: 17/656,546

(22) Filed: Mar. 25, 2022

(65) Prior Publication Data

US 2022/0305365 A1    Sep. 29, 2022

Related U.S. Application Data

(60) Provisional application No. 63/166,830, filed on Mar. 26, 2021.

(51) Int. Cl.
A63B 71/06    (2006.01)
A63B 24/00    (2006.01)

(52) U.S. Cl.
CPC ...... *A63B 71/0616* (2013.01); *A63B 24/0021* (2013.01); *A63B 24/0062* (2013.01);
(Continued)

(58) Field of Classification Search
CPC ............ A63B 71/0616; A63B 71/0669; A63B 2200/14
See application file for complete search history.

(56) References Cited

U.S. PATENT DOCUMENTS

2010/0228366 A1*    9/2010 Sanders ............. A63B 69/3623
                                                                    700/91
2011/0230274 A1    9/2011 Lafortune et al.
(Continued)

FOREIGN PATENT DOCUMENTS

WO    2005/020126    3/2005

OTHER PUBLICATIONS

PCT International Application No. PCT/US22/21959, International Search Report and Written Opinion of the International Searching Authority, dated Jun. 28, 2022, 8 pages.
(Continued)

*Primary Examiner* — Thomas H Henry
(74) *Attorney, Agent, or Firm* — Bookoff McAndrews, PLLC

(57) ABSTRACT

A computing system retrieves historical hole-by-hole data for a plurality of holes for plurality of golf tournaments for a plurality of players. The historical hole-by-hole data includes a yardage of each hole and a par associated with each hole. The computing system clusters the plurality of holes into a plurality of clusters of hole types. The computing system generates a strokes gained metric for each hole type of the hole-by-hole data for each player. The computing system adjusts the strokes gained metric for each hole type based on a field of strength metric associated with each tournament. The field of strength metric represents a strength of a player field in a given tournament. The computing system generates a ranking of the plurality of players based on the adjusted strokes gained metric.

20 Claims, 6 Drawing Sheets

(52) U.S. Cl.
CPC .. *A63B 71/0669* (2013.01); *A63B 2024/0056* (2013.01); *A63B 2024/0068* (2013.01); *A63B 2220/17* (2013.01)

(56) References Cited

U.S. PATENT DOCUMENTS

| | | |
|---|---|---|
| 2015/0182836 A1 | 7/2015 | Freeman et al. |
| 2020/0045385 A1 | 2/2020 | Packard et al. |
| 2020/0197747 A1 | 6/2020 | Broadie et al. |

OTHER PUBLICATIONS

Broadie, "Assessing golfer performance on the PGA Tour" Interfaces 42.2, Mar. 2012, pp. 146-165.

Extended European Search Report of European Application No. EP 22776731.6 dated Jan. 2, 2025, 12 pages.

Pgatour.Com: "Strokes gained: How it works", PGATOUR.COM, May 31, 2016 (May 31, 2016), XP055722065, Retrieved from the Internet: URL:https://www.pgatour.com/news/2016/05/3 1/strokes-gained-defined.html [retrieved on Aug. 12, 2020].

* cited by examiner

| PLAYER | FRACAS | CUT % | 1st RD WIN % | WIN % | TOP 20 % | TOP 10 % | TOP 5 % |
|---|---|---|---|---|---|---|---|
| 1 + VIKTOR HOVLAND | 2.217 | 86.4 | 7.0 | 9.4 | 64.4 | 48.0 | 33.3 |
| 2 + JUSTIN THOMAS | 2.051 | 86.6 | 5.1 | 7.0 | 62.2 | 44.0 | 28.9 |
| 3 + XANDER SCHAUFFELE | 1.906 | 85.9 | 4.3 | 5.6 | 59.7 | 40.9 | 25.7 |

FIG. 4A

FIELD RATING AND COURSE ADJUSTED STROKES GAINED FOR GLOBAL GOLF ANALYSIS

CROSS-REFERENCE TO RELATED APPLICATIONS

This application claims priority to U.S. Provisional Application Ser. No. 63/166,830, filed Mar. 26, 2021, which is hereby incorporated by reference in its entirety.

FIELD OF THE DISCLOSURE

The present disclosure generally relates to a system and method for analyzing and ranking golfers.

BACKGROUND

Ranking players in sports is often a difficult task. For the sport of golf, the difficulty is heightened because there is not a set number of games against a common group of teams within a contained league. Instead, in golf there are tours of varying quality all over the globe. Players that participate in these tournaments are often independent contractors who are either invited to the tournament or qualify via performance in other tournaments

SUMMARY

In some embodiments, a method is disclosed herein. The computing system retrieves historical hole-by-hole data for a plurality of holes for plurality of golf tournaments for a plurality of players. The historical hole-by-hole data includes a yardage of each hole and a par associated with each hole. The computing system clusters the plurality of holes into a plurality of clusters of hole types. The computing system generates a strokes gained metric for each hole type of the hole-by-hole data for each player. The computing system adjusts the strokes gained metric for each hole type based on a field of strength metric associated with each tournament. The field of strength metric represents a strength of a player field in a given tournament. The computing system generates a ranking of the plurality of players based on the adjusted strokes gained metric.

In some embodiments, a non-transitory computer readable medium is disclosed herein. The non-transitory computer readable medium includes one or more sequences of instructions, which, when executed by one or more processors, causes a computing system to perform operations. The operations include retrieving, by the computing system, historical hole-by-hole data for a plurality of holes for plurality of golf tournaments for a plurality of players. The historical hole-by-hole data includes a yardage of each hole and a par associated with each hole. The operations further include clustering, by the computing system, the plurality of holes into a plurality of clusters of hole types. The operations further include generating, by the computing system, a strokes gained metric for each hole type of the hole-by-hole data for each player. The operations further include adjusting, by the computing system, the strokes gained metric for each hole type based on a field of strength metric associated with each tournament. The field of strength metric represents a strength of a player field in a given tournament. The operations further include generating, by the computing system, a ranking of the plurality of players based on the adjusted strokes gained metric.

In some embodiments, a system is disclosed herein. The system includes a processor and a memory. The memory has memory has programming instructions stored thereon, which, when executed by the processor, causes the system to perform operations. The operations include retrieving historical hole-by-hole data for a plurality of holes for plurality of golf tournaments for a plurality of players. The historical hole-by-hole data includes a yardage of each hole and a par associated with each hole. The operations further include clustering the plurality of holes into a plurality of clusters of hole types. The operations further include generating a strokes gained metric for each hole type of the hole-by-hole data for each player. The operations further include adjusting the strokes gained metric for each hole type based on a field of strength metric associated with each tournament. The field of strength metric represents a strength of a player field in a given tournament. The operations further include generating a ranking of the plurality of players based on the adjusted strokes gained metric.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

FIG. 4A is a block diagram illustrating an example graphical user interface, according to example embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Due to the nature of golf, it is typically difficult to rank players due to the variety of tours and the variety of fields across tournaments. Tournaments may be played at a wide variety of courses and strength of fields. Due to the variance of individual skill sets of golfers, certain players may be a consistent contender on one course, while struggle on another course. Sometimes this variance may be attributed to the golfer's preference (e.g., the golfer may prefer the first course to the second course). Other times this variance may be attributed to the strength of the field (e.g., the first course may be in a tournament with a weaker field compared to the second course in a second tournament).

Additionally, there is also an issue of small sample size. Golfers typically participate in around twenty sanctioned tournaments a year. Given this small sample size, it is often difficult to accurately train an artificial intelligence model to draw conclusions from, especially considering the variance of individual skill sets.

The present approach improves upon conventional systems by utilizing individual player performance relative to the tournament in which they are playing, as well as calculated recency bias, to generate one or more metrics. In some embodiments, the metrics may include a course agnostic global golf ranking, a course specific global golf ranking, and individual player and hole predictions. By taking this approach, the present system may allow for comparison of golfers across continents and tours and creates a unique set of rankings for any course design. Additionally, through a hole-by-hole analysis, the present system is able to generate individual hole predictions for any golfer on any hole.

Figure 1:
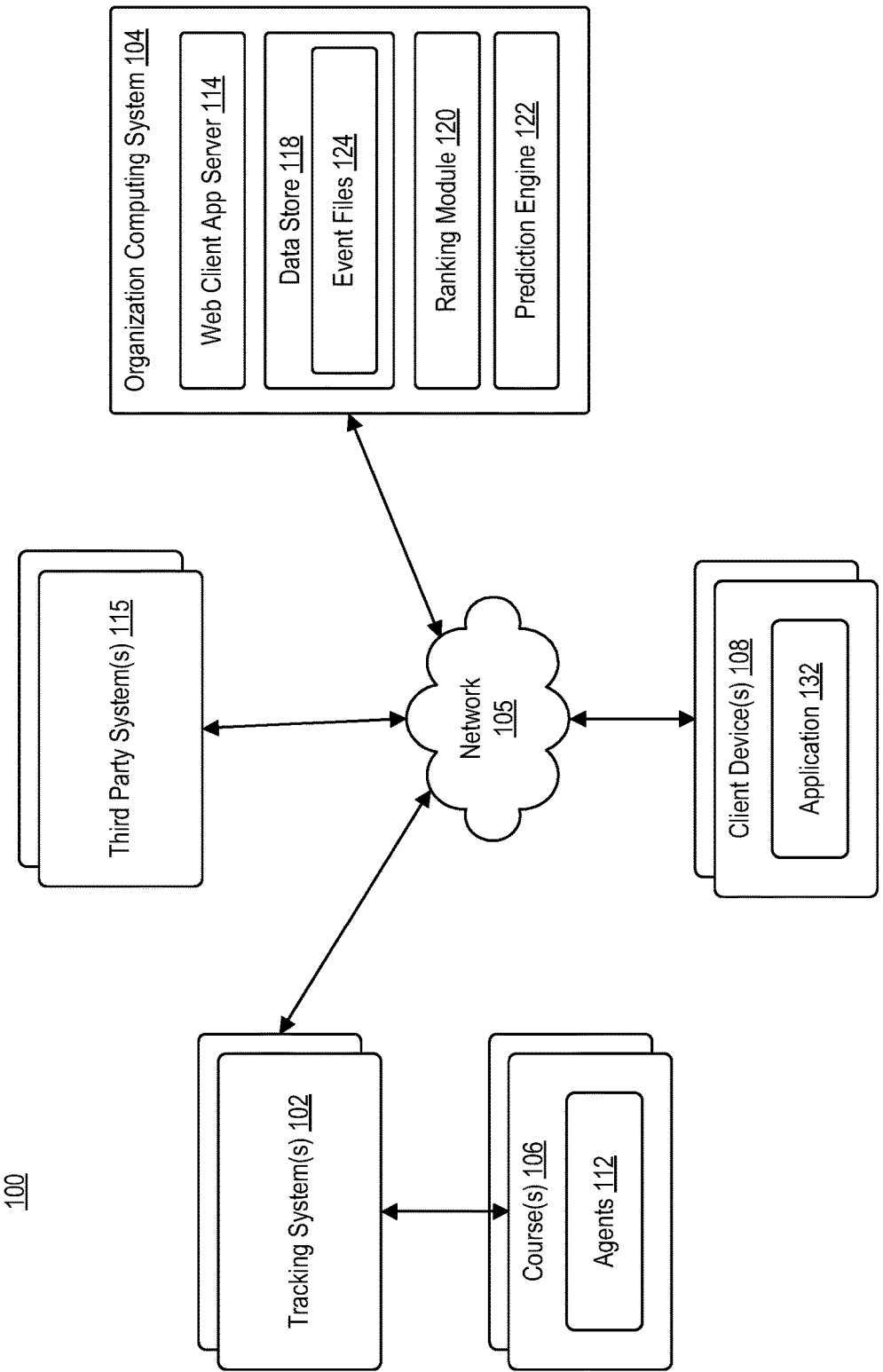
FIG. 1 is a block diagram illustrating a computing environment, according to example embodiments.

FIG. 1 is a block diagram illustrating a computing environment 100, according to example embodiments. Computing environment 100 may include tracking system 102, organization computing system 104, one or more client devices 108, and one or more third party systems 115 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of environment 100.

Tracking system 102 may be associated with a course 106. For example, course 106 may be configured to host a sporting event that includes one or more agents 112 (or golfers). Tracking system 102 may be configured to record the motions of all agents (i.e., players) on the playing surface, as well as one or more other objects of relevance (e.g., ball location, weather predictions, hole number, course name, pin location, hazard locations, stroke count, and the like). In some embodiments, tracking system 102 may be an optically-based system using, for example, a plurality of cameras. In some embodiments, tracking system 102 may be a radio-based system using, for example, radio frequency identification (RFID) tags worn by players or embedded in objects to be tracked. Generally, tracking system 102 may be configured to sample and record, at a high frame rate. Tracking system 102 may be configured to store at least player identity, stroke information, and location (e.g., (x, y) position) for all agents and objects (e.g., ball) on the course for each hole.

Tracking system 102 may be configured to communicate with organization computing system 104 via network 105. Organization computing system 104 may be configured to manage and analyze the data captured by tracking system 102. Organization computing system 104 may include at least a web client application server 114, a data store 118, a ranking module 120, and a prediction engine 122.

Each of ranking module 120 and prediction engine 122 may be comprised of one or more software modules. The one or more software modules may be collections of code or instructions stored on a media (e.g., memory of organization computing system 104) that represent a series of machine instructions (e.g., program code) that implement one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Data store 118 may be configured to store one or more event files 124. Each event file 124 may be captured and generated by a tracking system 102. In some embodiments, each of the one or more event files 124 may include all the raw data captured from a tournament or round. For example, the raw data contained in each event file 124 may include, but is not limited to, hole-by-hole information for each golfer. The hole-by-hole information may include the yardage and the stroke number.

Ranking module 120 may be configured to rank golfers globally. To do so, ranking module 120 may analyze the hole-by-hole data of each event file, as well as contextual information (e.g., short-par 3, a long par 4, etc.) about each course and the field of golfers in the tournament, to create an adjusted strokes gained metric for each golfer. By generating a strokes gained metric, as opposed to conventional approaches that use cumulative strokes under par or over par, ranking module 120 is able to take into account the different expectancies of scores across different courses. Relying on cumulative strokes under par or over par can inappropriately weight good performances at courses where scores are very low. For example, a golfer shooting −14 and outscoring the field by three strokes should be weighted similarly to a golfer shooting +2 but outscoring the field by three strokes. By utilizing the strokes gained metric, ranking module 120 can take into account this nuance in golf, thus accounting for different courses having different score expectancies.

Further, one of the benefits of considering hole-by-hole data instead of tournament or round data is that it greatly increases the sample size for prediction engine 122. If ranking module 120 considers how each player performs on each hole relative to field average, ranking module 120 increases the sample size eighteen-fold. This allows ranking module 120 to drill down further into both how a player scores on each type of hole and the variance of how they score.

Based on the hole-by-hole data, ranking module 120 may determine how each golfer performs on each hole relative to the field, rather than over a full round or full tournament. In doing so, ranking module 120 may achieve, not only an overall ranking, but a ranking on specific hole types. Such ranking may enable prediction engine 122 to generate more accurate predictions, as prediction engine 122 may be able to decompose a course into specific holes and create a prediction for how any player will perform on each hole.

For each hole the golfer played, ranking module 120 may generate a strokes gained value. This stands in comparison to conventional approaches that analyze a golfer's performance on a per round or per tournament basis. In some embodiments, ranking module 120 may categorize holes based on par and yardage. For example, ranking module 120 may categorize a hole into one of five types:

Short par 3s: par 3 under 195.5 yards
Long par 3s: par 3 over 195.5 yards
Short par 4s: par 4 over 449.5 yards
Long par 4s: par 4 over 449.5 yards
Par 5s As those skilled in the art recognize, the foregoing ranges are exemplary and can be adjusted to the preference of the administrator.

In some embodiments, ranking module 120 may utilize a clustering algorithm to cluster holes into hole types. For example, ranking module 120 may use a k-means clustering algorithm to cluster the historical hole information into k-clusters of hole types.

In some embodiments, for par 3s, anything between 178.5 yards and 212.5 yards may be considered both a short par 3 and a long par 3, weighted proportionally towards one or the other depending on the length. Similar logic may be applied by ranking module 120 for par 4s. Such categorization may allow ranking module 120 to stylize golfers based on their strengths.

In some embodiments, ranking module 120 may standardize the strokes gained metric based on a strength of field metric associated with a tournament in which a hole is played. Ranking module 120 may retrieve a strength of field metric from one or more third party systems 115.

In some embodiments, one or more third party systems 115 may be associated with servers or websites configured to host strength of field metrics for a tournament. For example, one or more third party systems 115 may be configured to host strength of field metrics associated with the Official World Golf Rankings. The Official World Golf Rankings assigns a strength of field value to each tournament based on who is playing. Ranking module 120 may retrieve strength of field data generated by the Official World Golf Rankings from one or more third party systems 115. To standardize all tournaments, ranking module 120 may use the strength of field numbers from the Official World Golf Rankings to adjust the strokes gained metric for each hole.

It is important to note that the Official World Golf Rankings do not predict future performance of golfers in upcoming tournaments. Instead, the Official World Golf Rankings only assigns world ranking points based on a player's finish in a tournament. In other words, the Official World Golf Rankings may explain how each player has earned their place in upcoming tournaments, but does not predict future performance in the upcoming tournaments.

Using a specific example of the Official World Golf Rankings, Patrick Cantlay plays in tournaments where the average strength of field is 556. Will Zalatoris plays in tournaments where the average strength of field is 232. When looking at their performances in those tournaments, that difference alone is worth about 0.5 strokes. This difference may not seem like a lot, but half a stroke is what separates the No. #17 golfer in the world from the No. #38 golfer.

In some embodiments, ranking module 120 may further adjust the strokes gained metric using one or more recency adjustments. For example, ranking module 120 may utilize a decay formula to weight recency. The recency adjustments help ranking module 120 provide more weight to more recent holes played, compared to holes played 26 tournaments ago.

Using the adjusted strokes gained metrics, ranking module 120 can generate a ranking of golfers based on average course composition of strong tournaments. For example, based on the course composition of strong tournaments, ranking module 120 may determine that there are, on average, 2.04 short par 3s, 2.01 long par 3s, 6.16 short par 4s, 4.57 long par 4s, and 3.21 par 5s in each course. Ranking module 120 can generate an overall ranking for players based on the average course composition of strong tournaments and the adjusted strokes gained metrics. In some embodiments, the ranking can be weighted based on the one or more recency adjustments. For example, ranking module 120 may apply a decay factor of 0.94. In other words, each tournament may be weighted at 0.94 of the next tournament.

Prediction engine 122 may be configured to project a player's performance in an upcoming tournament based on hole information for the tournament and strength of field. For example, for a given tournament, prediction engine 122 may identify hole information associated with each hole in each round. The hole information may include the yardage and the par associated with the hole. Using the hole information, prediction engine 122 may project a player's performance in the tournament based on one or more of the adjusted strokes gained metric generated by ranking module 120 for each hole type based on historical player performance and a strength of field ranking for the upcoming tournament.

Client device 108 may be in communication with organization computing system 104 via network 105. Client device 108 may be operated by a user. For example, client device 108 may be a mobile device, a tablet, a desktop computer, or any computing system having the capabilities described herein. Users may include, but are not limited to, individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 108 may include at least application 132. Application 132 may be representative of a web browser that allows access to a website or a stand-alone application. Client device 108 may use access application 132 to access one or more functionalities of organization computing system 104. Client device 108 may communicate over network 105 to request a webpage, for example, from web client application server 114 of organization computing system 104. For example, client device 108 may be configured to execute application 132 to access content managed by web client application server 114. The content that is displayed to client device 108 may be transmitted from web client application server 114 to client device 108, and subsequently processed by application 132 for display through a graphical user interface (GUI) of client device 108.

Figure 2:
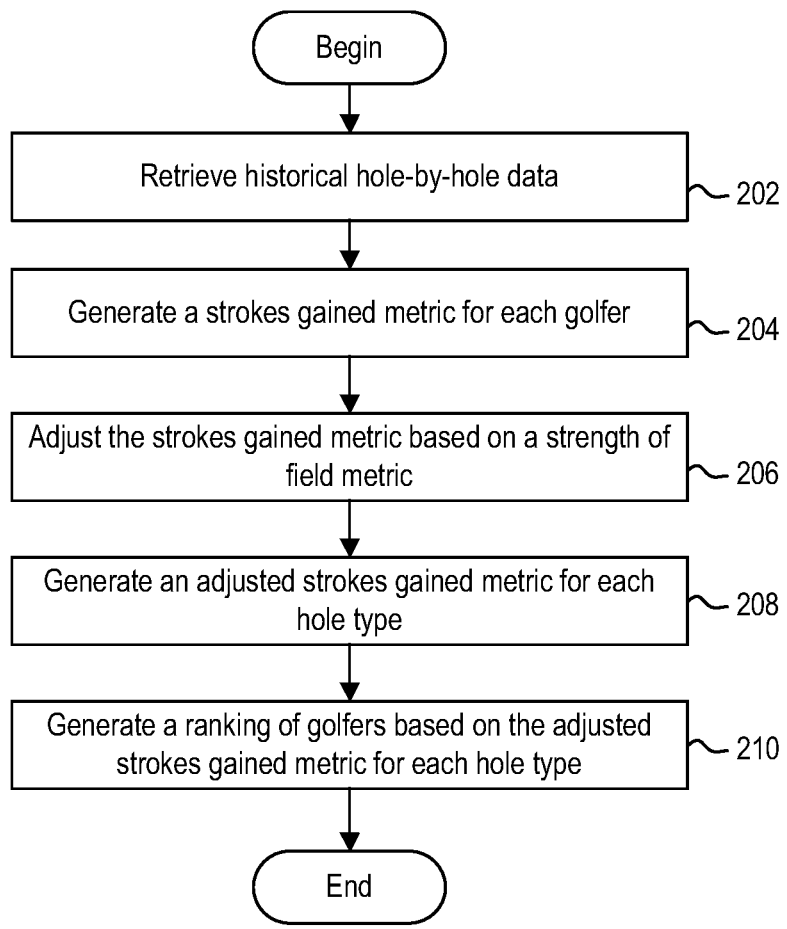
FIG. 2 is a flow diagram illustrating a method for generating a ranking of golfer, according to example embodiments.

FIG. 2 is a flow diagram illustrating a method 200 for generating a ranking of golfer, according to example embodiments. Method 200 may begin a step 202.

At step 202, organization computing system 104 may retrieve historical hole-by-hole data for a plurality of golfers. The hole-by-hole information may include the yardage and the stroke number associated with each hole, as well as the golfer's score on that hole.

At step 204, organization computing system 104 may generate a strokes gained metric for each golfer based on the hole-by-hole data. Ranking module 120 may analyze the hole-by-hole data of each event file, as well as contextual information about each course and the field of golfers in the tournament, to create the strokes gained metric. Ranking module 120 may generate a strokes gained metric for each hole type. For example, ranking module 120 may generate a strokes gained metric for short par 3s, long par 3s, short par 4s, long par 4s, and par 5s.

At step 206, ranking module 120 may adjust the strokes gained metric based on a strength of field metric associated with a tournament in which a hole is played to generate an adjusted strokes gained metric. In some embodiments, ranking module 120 may retrieve a strength of field metric from one or more third party systems 115. For example, ranking module 120 may retrieve the strength of field data from the Official World Golf Rankings from one or more third party systems 115. The strength of field data from the official world golf rankings is assigned to a tournament based on the pre-tournament world golf ranking points for each player in the field. These points are gained based on finishing positions in previous tournaments. Ranking module 120 may use the strength of field numbers from the official world golf rankings to adjust the strokes gained metric for each hole.

At step 208, organization computing system 104 may generate an adjusted strokes gained metric for each hole type. For example, ranking module 120 may aggregate the adjusted strokes gained metric for each hole in the hole-by-hole data to determine the adjusted strokes gained metric for each hole type. The hole types may include, but are not limited to, short par 3s, long par 3s, short par 4s, long par 4s, and par 5s.

At step 210, organization computing system 104 may generate a ranking of golfers based on the adjusted strokes gained metric for each hole type. Ranking module 120 may standardize the ranking of golfers based on average course composition. For example, ranking module 120 may determine that the course composition of strong tournaments, on average, include 2.04 short par 3s, 2.01 long par 3s, 6.16 short par 4s, 4.57 long par 4s, and 3.21 par 5s in each course. Ranking module 120 can generate an overall ranking for players based on the average course composition of strong tournaments and the adjusted strokes gained metrics.

Figure 3:
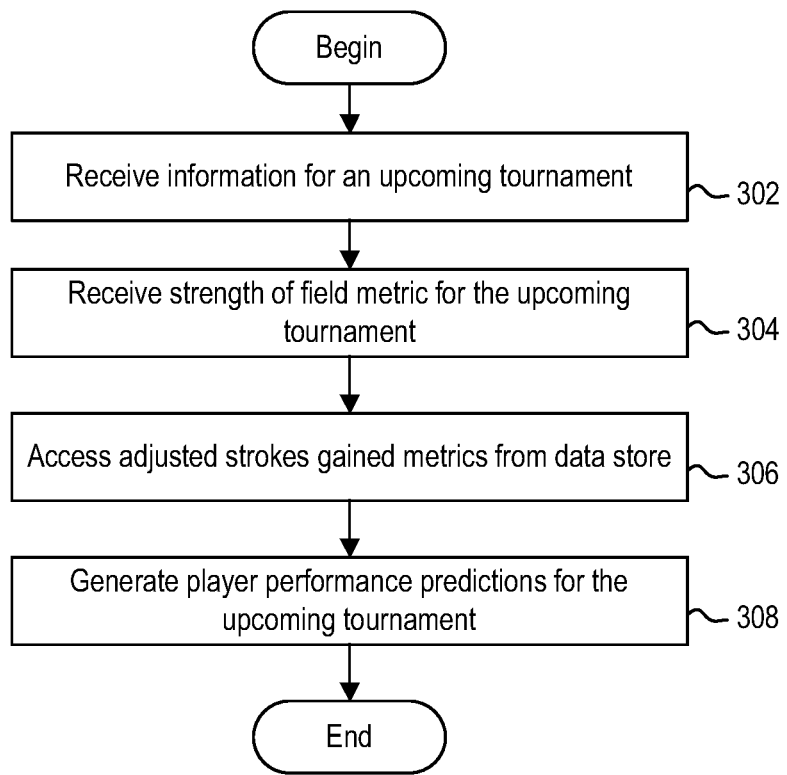
FIG. 3 is a flow diagram illustrating a method of predicting an outcome for an upcoming tournament, according to example embodiments.

FIG. 3 is a flow diagram illustrating a method 300 of predicting an outcome for an upcoming tournament, according to example embodiments. Method 300 may begin at step 302.

At step 302, organization computing system 104 may receive information for an upcoming tournament. For example, prediction engine 122 may receive hole-by-hole information for each hole in each round of the tournament and the players in the player field. Exemplary hole information may include, but is not limited to, a number of short par 3s, a number of long par 3s, a number of short par 4s, a number of long par 4s, and a number of par 5s. In some embodiments, exemplary hole information may include a hole type associated with each hole. Exemplary hole types may include, but are not limited to, short par 3s (e.g., par 3s under 195.5 yards), long par 3s (e.g., par 3s over 195.5 yards), short par 4s (e.g., par 4s under 449.5 yards), long par 4s (e.g., par 4s over 449.5 yards), and par 5s.

At step 304, organization computing system 104 may receive strength of field metric for the upcoming tournament. In some embodiments, prediction engine 122 may receive the strength of field metric from one or more third party systems 115. The strength of field metric may be representative of the strength of field metric generated by the Official World Golf Rankings.

At step 306, organization computing system 104 may retrieve adjusted strokes gained metrics from data store 118. For example, prediction engine 122 may retrieve the adjust strokes gained metric, generated by ranking module 120, from data store 118 for each player in the player field for each hole type.

At step 308, organization computing system 104 may generate player performance predictions for the upcoming tournament. Using the hole-by-hole information, the field of strength metric, and the adjusted strokes gained metric, prediction engine 122 may project each player's performance.

In some embodiments, the player performance predictions may be dynamically updated based on live in-tournament action. For example, prediction engine 122 may be configured to dynamically update player performance predictions after each hole in the tournament. In this manner, the player performance predictions may update in real-time, near real-time, or periodically (e.g., after every hole), based on real-time tournament data.

Further, it is important to note, that while the foregoing discussion references an individual tournament, where each player or golfer is competing against the rest of the field, those skilled in the art recognize that such techniques can be applied to team play (e.g., Ryder Cup) where, instead of every golfer for themselves, the outcome of the tournament is based on the performance of a team of golfers. In such scenarios, ranking module 120 and/or prediction engine 122 can aggregate the data to generate predictions on a team level.

In some embodiments, ranking module 120 and prediction engine 122 may be configured to handle a variety of tournament types. For example, for Stableford scoring, rather than a total score, Stableford scoring uses points for scores on each hole. For example, an albatross is worth 5 points, an eagle is worth 4 points, a birdie is worth 3 points, even par is worth 2 points, bogey is worth 1 point, and double bogey or worse is worth 0 points. The process performed by ranking module 120 and prediction engine 122 may be substantially the same as the foregoing functionality. However, there is an additional step of assigning points to individual hole scores when ranking and generating future predictions.

In some embodiments, ranking module 120 and prediction engine 122 may be configured to handle match play rules (e.g., 1 v. 1 or 2 v. 2). In some embodiments, holes may be scored individually, and only one point can be won on any given hole. If, for example, a golfer beats their opponent by 4 strokes on one hole, it is only counted as a 1-point victory. Holes may be played until one player can no longer win, or through 18 holes in the event of a tie. If a player is down by 3 strokes with 2 holes to play, that player can no longer win the match and the match is scored as a "3 and 2 Victory" for the leading player.

The foregoing techniques can be applied to match play rules. For example, for individual matches, holes may be scored for each player, compared, and then a winner or tie may be determined. This progresses until the match ends in a tie or a player accrues enough points to win. In match play competitions where a bracket-style tournament occurs, ranking module 120 and prediction engine 122 may work in conjunction to simulate results based on a player's likelihood to win their pool and then win successive single-elimination matches.

FIG. 4A is a block diagram illustrating an example graphical user interface (GUI) 400, according to example embodiments. GUI 400 may be representative of an exemplary graphical user interface that may be presented to a user via client device 108.

GUI 400 may include predictions generated by prediction engine 122 for an upcoming tournament. As shown, prediction engine 122 may be trained to generate various predictions for an upcoming tournament. The various predictions may include, but are not limited to, a field rating and course adjusted strokes gained metric, a likelihood of the player making the cut, a likelihood of a first round win, a likelihood of winning the tournament, a likelihood of making the top 20, a likelihood of making the top 10, and a likelihood of making the top 5. For example, prediction engine 122 may estimate the cut number based on the ranked list; once the tournament is live, prediction engine 122 may be conditioned based on the projected cut line.

Figure 4B:
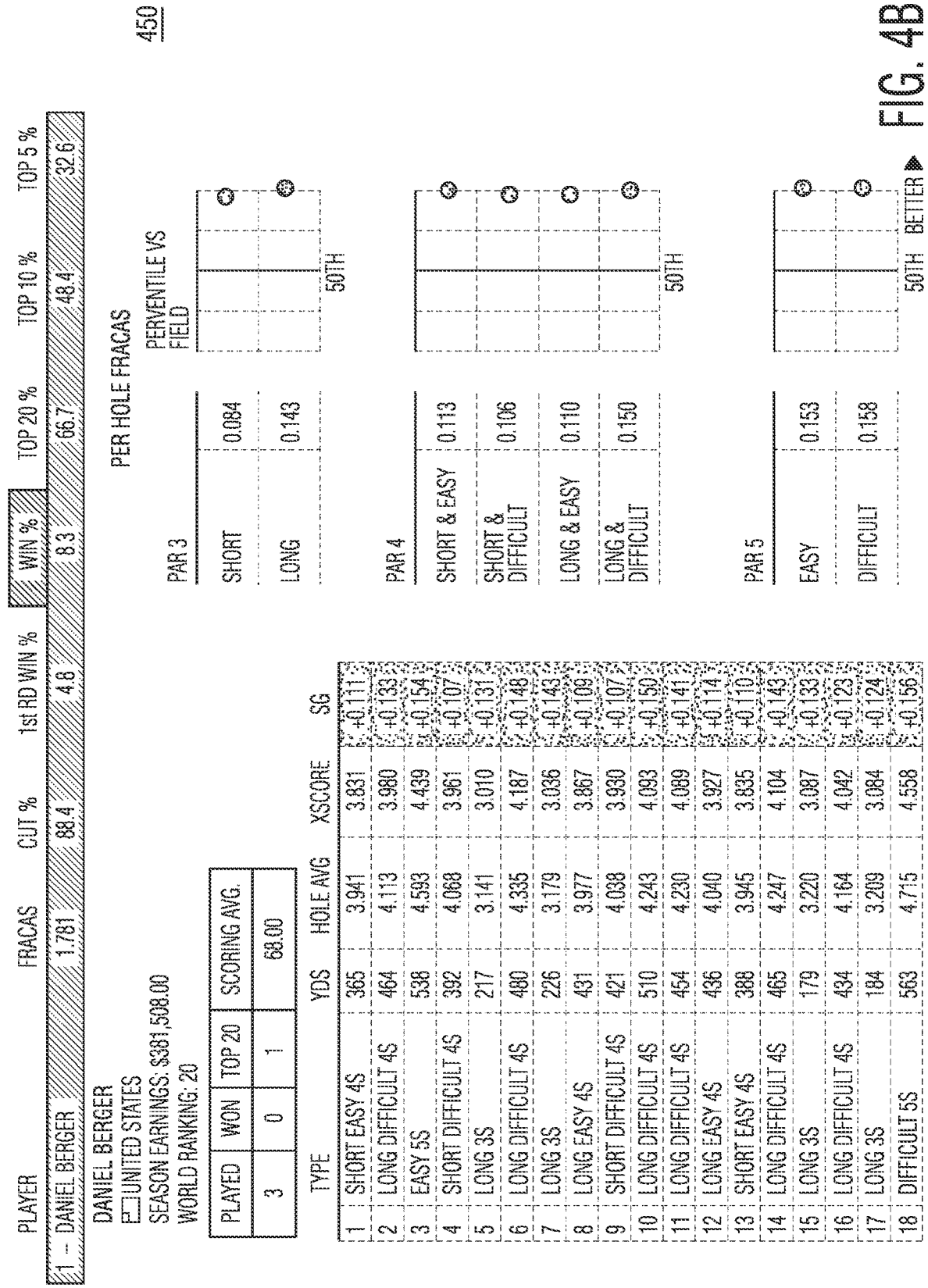
FIG. 4B is a block diagram illustrating an example graphical user interface, according to example embodiments.

FIG. 4B is a block diagram illustrating an example graphical user interface (GUI) 450, according to example embodiments. GUI 450 may be representative of an exemplary graphical user interface that may be presented to a user via client device 108. GUI 450 may be generated responsive to a user selecting Daniel Berger.

As shown, GUI 450 may include historical and current data associated with Daniel Berger. Such historical and current data may include, but are not limited to, an adjusted strokes gained score for each hole type, a current world ranking, and the like.

Figure 5A:
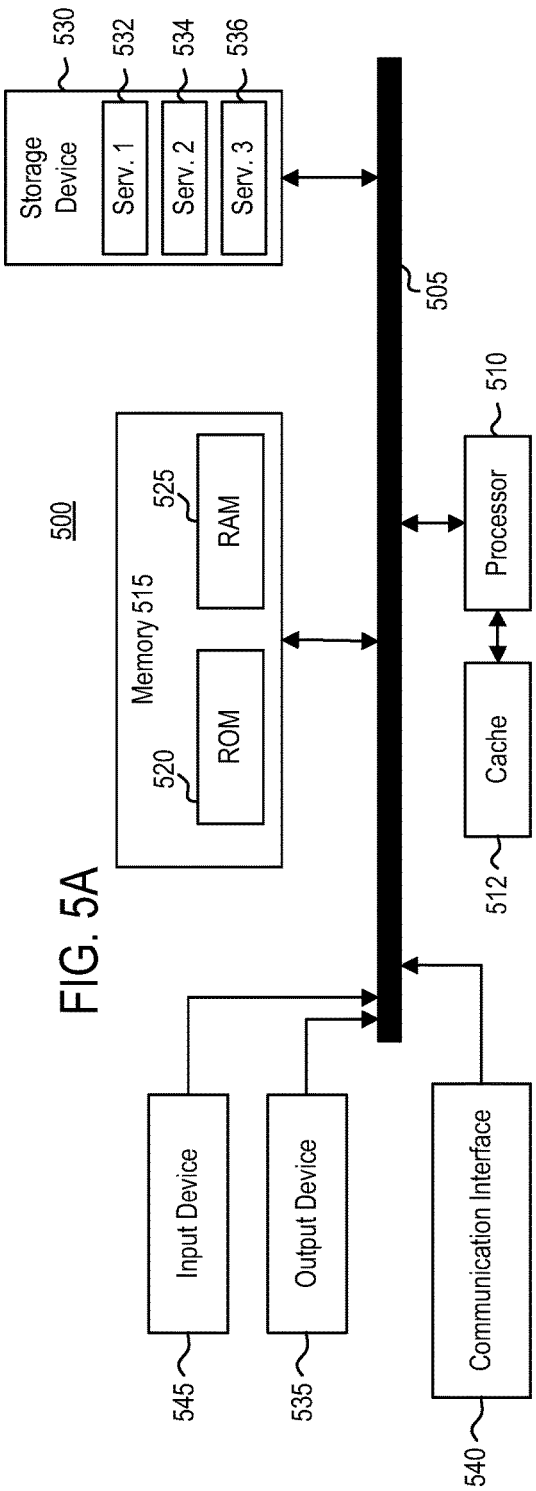
FIG. 5A is a block diagram illustrating a computing device, according to example embodiments.

FIG. 5A illustrates an architecture of system bus computing system 500, according to example embodiments. One or more components of system 500 may be in electrical communication with each other using a bus 505. System 500 may include a processor (e.g., one or more CPUs, GPUs or other types of processors) 510 and a system bus 505 that couples various system components including the system memory 515, such as read only memory (ROM) 520 and random access memory (RAM) 525, to processor 510. System 500 can include a cache of high-speed memory connected directly with, in close proximity to, or integrated as part of processor 510. System 500 can copy data from memory 515 and/or storage device 530 to cache 512 for quick access by processor 510. In this way, cache 512 may provide a performance boost that avoids processor 510 delays while waiting for data. These and other modules can control or be configured to control processor 510 to perform various actions. Other system memory 515 may be available for use as well. Memory 515 may include multiple different types of memory with different performance characteristics. Processor 510 may be representative of a single processor or multiple processors. Processor 510 can include one or more of a general purpose processor or a hardware module or software module, such as service 1 532, service 2 534, and service 5 536 stored in storage device 530, configured to control processor 510, as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction with the system 500, an input device 545 can be any number of input mechanisms, such as a microphone for speech, a touch-sensitive screen for gesture or graphical input, keyboard, mouse, motion input, speech and so forth. An output device 535 (e.g., a display) can also be one or more of a number of output mechanisms known to those of skill in the art. In some instances, multimodal systems can enable a user to provide multiple types of input to communicate with system 500. Communication interface 540 can generally govern and manage the user input and system output. There is no restriction on operating on any particular hardware arrangement and therefore the basic features here may easily be substituted for improved hardware or firmware arrangements as they are developed.

Storage device 530 may be a non-volatile memory and can be a hard disk or other type of computer readable media that can store data that are accessible by a computer, such as magnetic cassettes, flash memory cards, solid state memory devices, digital versatile disks, cartridges, random access memories (RAMs) 525, read only memory (ROM) 520, and hybrids thereof.

Storage device 530 can include services 532, 534, and 536 for controlling the processor 510. Other hardware or software modules are contemplated. Storage device 530 can be connected to system bus 505. In one aspect, a hardware module that performs a particular function can include the software component stored in a computer-readable medium in connection with the necessary hardware components, such as processor 510, bus 505, output device 535 (e.g., a display), and so forth, to carry out the function.

Figure 5B:
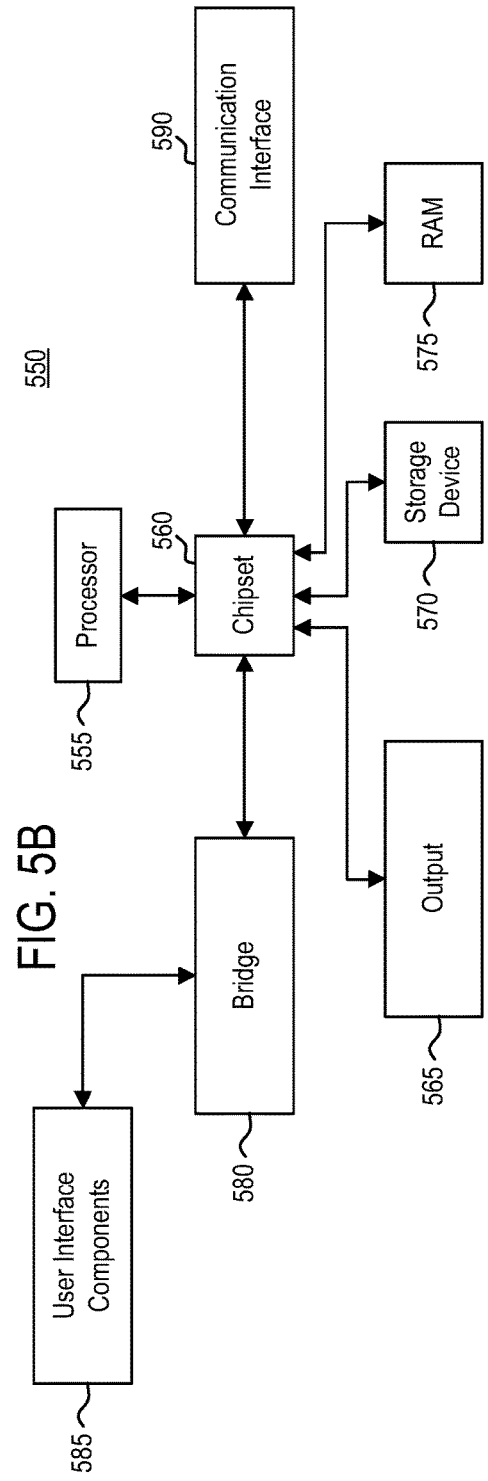
FIG. 5B is a block diagram illustrating a computing device, according to example embodiments.

FIG. 5B illustrates a computer system 550 having a chipset architecture, according to example embodiments. Computer system 550 may be an example of computer hardware, software, and firmware that can be used to implement the disclosed technology. System 550 can include one or more processors 555, representative of any number of physically and/or logically distinct resources capable of executing software, firmware, and hardware configured to perform identified computations. One or more processors 555 can communicate with a chipset 560 that can control input to and output from one or more processors 555. In this example, chipset 560 outputs information to output 565, such as a display, and can read and write information to storage device 570, which can include magnetic media, and solid-state media, for example. Chipset 560 can also read data from and write data to storage device 575 (e.g., RAM). A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by one or more processors 555 analyzing data stored in storage device 570 or 575. Further, the machine can receive inputs from a user through user interface components 585 and execute appropriate functions, such as browsing functions by interpreting these inputs using one or more processors 555.

It can be appreciated that example systems 500 and 550 can have more than one processor 510 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method, comprising:
    recording, by a computing system, tracking data corresponding to one or more motions of a plurality of players or one or more objects via at least one of: one or more cameras or one or more radio frequency identification (RFID) tags for a plurality of holes for a plurality of golf tournaments, wherein the tracking data comprises a distance of each of the plurality of holes and a par associated with each of the plurality of holes;
    utilizing, by the computing system, a clustering algorithm to cluster the plurality of holes into a plurality of hole clusters based on a hole type corresponding to each of the plurality of holes;
    analyzing, by the computing system, the tracking data for each of the plurality of holes and the corresponding hole type to generate a strokes gained metric for each of the hole type;
    adjusting, by the computing system, the strokes gained metric for each hole type based on a field of strength metric associated with each of the plurality of golf tournaments, the field of strength metric representing a strength of a player field in a corresponding golf tournament; and
    generating, by the computing system, a ranking of the plurality of players based on the adjusted strokes gained metric.

2. The method of claim 1, wherein generating, by the computing system, the ranking of the plurality of players based on the adjusted strokes gained metric comprises:
    generating a first ranking corresponding to a first adjusted strokes gained metric for a first hole type; and
    generating a second ranking corresponding to a second adjusted strokes gained metric for a second hole type.

3. The method of claim 2, wherein the adjusted strokes gained metric is a function of the first adjusted strokes gained metric and the second adjusted strokes gained metric.

4. The method of claim 1, wherein generating, by the computing system, the ranking of the plurality of players based on the adjusted strokes gained metric comprises:
    applying a decay factor to the strokes gained metrics, wherein the decay factor provides more weight to more recent strokes gained metrics.

5. The method of claim 1, further comprising:
    receiving, by the computing system, information for an upcoming tournament, wherein the information comprises hole data for each target hole and a target field of players;
    accessing, by the computing system, adjusted strokes gained metrics for each target player in the target field of players; and
    generating, by the computing system, a projected performance metric for each target player based on the hole data and the adjusted strokes gained metrics for each target player.

6. The method of claim 5, wherein generating, by the computing system, the projected performance metric for each target player based on the hole data and the adjusted strokes gained metrics for each target player comprises:
    generating a likelihood of each target player making a cut at the upcoming tournament.

7. The method of claim 5, wherein generating, by the computing system, the projected performance metric for each target player based on the hole data and the adjusted strokes gained metrics for each target player comprises:
    generating a projected adjusted strokes gained metric for each target player; and
    ranking each target player based on the adjusted strokes gained metric.

8. A non-transitory computer readable medium comprising one or more sequences of instructions, which, when executed by one or more processors, causes a computing system to perform operations comprising:
    recording, by the computing system, tracking data corresponding to one or more motions of a plurality of players or one or more objects via at least one of: one or more cameras or one or more radio frequency identification (RFID) tags for a plurality of holes for a plurality of golf tournaments, wherein the tracking data comprises a distance of each of the plurality of holes and a par associated with each of the plurality of holes;
    utilizing, by the computing system, a clustering algorithm to cluster the plurality of holes into a plurality of hole clusters based on a hole type corresponding to each of the plurality of holes;
    analyzing, by the computing system, the tracking data for each of the plurality of holes and the corresponding hole type to generate a strokes gained metric for each of the hole type;
    adjusting, by the computing system, the strokes gained metric for each hole type based on a field of strength metric associated with each of the plurality of golf tournaments, the field of strength metric representing a strength of a player field in a corresponding golf tournament; and
    generating, by the computing system, a ranking of the plurality of players based on the adjusted strokes gained metric.

9. The non-transitory computer readable medium of claim 8, wherein generating, by the computing system, the ranking of the plurality of players based on the adjusted strokes gained metric comprises:
generating a first ranking corresponding to a first adjusted strokes gained metric for a first hole type; and
generating a second ranking corresponding to a second adjusted strokes gained metric for a second hole type.

10. The non-transitory computer readable medium of claim 9, wherein the adjusted strokes gained metric is a function of the first adjusted strokes gained metric and the second adjusted strokes gained metric.

11. The non-transitory computer readable medium of claim 8, wherein generating, by the computing system, the ranking of the plurality of players based on the adjusted strokes gained metric comprises:
applying a decay factor to the strokes gained metrics, wherein the decay factor provides more weight to more recent strokes gained metrics.

12. The non-transitory computer readable medium of claim 8, further comprising:
receiving, by the computing system, information for an upcoming tournament, wherein the information comprises hole data for each target hole and a target field of players;
accessing, by the computing system, adjusted strokes gained metrics for each target player in the target field of players; and
generating, by the computing system, a projected performance metric for each target player based on the hole data and the adjusted strokes gained metrics for each target player.

13. The non-transitory computer readable medium of claim 12, wherein generating, by the computing system, the projected performance metric for each target player based on the hole data and the adjusted strokes gained metrics for each target player comprises:
generating a likelihood of each target player making a cut at the upcoming tournament.

14. The non-transitory computer readable medium of claim 12, wherein generating, by the computing system, the projected performance metric for each target player based on the hole data and the adjusted strokes gained metrics for each target player comprises:
generating a projected adjusted strokes gained metric for each target player; and
ranking each target player based on the adjusted strokes gained metric.

15. A system, comprising:
a processor; and
a memory having programming instructions stored thereon, which, when executed by the processor, causes the system to perform operations comprising:
recording tracking data corresponding to one or more motions of a plurality of players or one or more objects via at least one of: one or more cameras or one or more radio frequency identification (RFID) tags for a plurality of holes for a plurality of golf tournaments, wherein the tracking data comprises a distance of each of the plurality of holes and a par associated with each of the plurality of holes;
utilizing, a clustering algorithm to cluster the plurality of holes into a plurality of hole clusters based on a hole type corresponding to each of the plurality of holes;
analyzing the tracking data for each of the plurality of holes and the corresponding hole type to generate a strokes gained metric for each of the hole type;
adjusting the strokes gained metric for each hole type based on a field of strength metric associated with each of the plurality of golf tournaments, the field of strength metric representing a strength of a player field in a corresponding golf tournament; and
generating a ranking of the plurality of players based on the adjusted strokes gained metric.

16. The system of claim 15, wherein generating the ranking of the plurality of players based on the adjusted strokes gained metric comprises:
generating a first ranking corresponding to a first adjusted strokes gained metric for a first hole type; and
generating a second ranking corresponding to a second adjusted strokes gained metric for a second hole type.

17. The system of claim 15, wherein generating the ranking of the plurality of players based on the adjusted strokes gained metric comprises:
applying a decay factor to the strokes gained metrics, wherein the decay factor provides more weight to more recent strokes gained metrics.

18. The system of claim 15, wherein the operations further comprise:
receiving information for an upcoming tournament, wherein the information comprises hole data for each target hole and a target field of players;
accessing adjusted strokes gained metrics for each target player in the target field of players; and
generating a projected performance metric for each target player based on the hole data and the adjusted strokes gained metrics for each target player.

19. The system of claim 18, wherein generating the projected performance metric for each target player based on the hole data and the adjusted strokes gained metrics for each target player comprises:
generating a likelihood of each target player making a cut at the upcoming tournament.

20. The system of claim 18, wherein generating the projected performance metric for each target player based on the hole data and the adjusted strokes gained metrics for each target player comprises:
generating a projected adjusted strokes gained metric for each target player; and
ranking each target player based on the adjusted strokes gained metric.

* * * * *